(12) United States Patent
Taintor et al.

(10) Patent No.: US 8,412,563 B2
(45) Date of Patent: Apr. 2, 2013

(54) METHOD AND SYSTEM FOR ANALYZING AND OPTIMIZING DISTRIBUTION OF WORK FROM A PLURALITY OF QUEUES

(75) Inventors: Robert C. Taintor, Brighton, MA (US); Gregory David Leibon, Post Mills, VT (US)

(73) Assignee: FIS Financial Compliance Solutions, LLC, Jacksonville, FL (US)

( * ) Notice: Subject to any disclaimer, the term of this patent is extended or adjusted under 35 U.S.C. 154(b) by 249 days.

(21) Appl. No.: 12/829,854

(22) Filed: Jul. 2, 2010

(65) Prior Publication Data

US 2012/0004948 A1 Jan. 5, 2012

(51) Int. Cl.
*G06Q 10/00* (2012.01)
(52) U.S. Cl. ............... 705/7.39; 705/30; 705/35; 705/38
(58) Field of Classification Search .................. None
See application file for complete search history.

(56) References Cited

U.S. PATENT DOCUMENTS

| | | | | |
|---|---|---|---|---|
| 5,335,278 A * | 8/1994 | Matchett et al. | ............... | 380/248 |
| 5,386,104 A * | 1/1995 | Sime | ............... | 235/379 |
| 5,602,906 A * | 2/1997 | Phelps | ............... | 379/114.14 |
| 5,627,886 A * | 5/1997 | Bowman | ............... | 379/111 |
| 5,708,422 A * | 1/1998 | Blonder et al. | ............... | 340/5.41 |
| 6,029,144 A * | 2/2000 | Barrett et al. | ............... | 705/30 |
| 7,457,401 B2 * | 11/2008 | Lawyer et al. | ............... | 379/114.14 |
| 7,778,906 B2 * | 8/2010 | Koukis | ............... | 705/35 |
| 7,877,611 B2 * | 1/2011 | Camacho et al. | ............... | 713/182 |
| 2002/0194142 A1* | 12/2002 | Coffey | ............... | 705/67 |
| 2003/0191709 A1* | 10/2003 | Elston et al. | ............... | 705/40 |
| 2003/0208684 A1* | 11/2003 | Camacho et al. | ............... | 713/186 |
| 2006/0036560 A1* | 2/2006 | Fogel | ............... | 706/45 |
| 2007/0118427 A1* | 5/2007 | Storm | ............... | 705/18 |
| 2007/0124246 A1* | 5/2007 | Lawyer et al. | ............... | 705/50 |
| 2008/0109392 A1* | 5/2008 | Nandy | ............... | 706/47 |
| 2008/0195514 A1* | 8/2008 | Garg et al. | ............... | 705/35 |
| 2008/0288377 A1* | 11/2008 | Koukis | ............... | 705/30 |
| 2009/0089122 A1* | 4/2009 | Koukis | ............... | 705/7 |
| 2009/0172035 A1* | 7/2009 | Lessing et al. | ............... | 707/104.1 |
| 2009/0299857 A1* | 12/2009 | Brubaker | ............... | 705/14.66 |
| 2009/0319346 A1* | 12/2009 | Fogel et al. | ............... | 705/11 |
| 2010/0169252 A1* | 7/2010 | Fan et al. | ............... | 706/13 |
| 2010/0257092 A1* | 10/2010 | Einhorn | ............... | 705/38 |

OTHER PUBLICATIONS

Liou, F., Tang, Y., & Chen, J.. (2008). Detecting hospital fraud and claim abuse through diabetic outpatient services. Health Care Management Science, 11(4), 353-8.*

Petruska, K.. Accounting conservatism, cost of capital, and fraudulent financial reporting. Ph.D. dissertation, Kent State University, United States—Ohio.*

* cited by examiner

*Primary Examiner* — Gurkanwaljit Singh
(74) *Attorney, Agent, or Firm* — Finnegan, Henderson, Farabow, Garrett & Dunner, LLP

(57) ABSTRACT

A method and system for analyzing and optimizing the distribution of work from a plurality of queues includes storing historical data in a database. The historical data may include sets of different types of data items, each of the data items having an associated monetary value. The method further includes assigning a relative score to each of the data items within the sets and calculating a cumulative monetary value for each relative score, the cumulative monetary value being the summation of the monetary values for all items having relative scores up to and including the relative score. The method further includes determining the maximum cumulative monetary value calculated and its corresponding relative score. In one embodiment, the corresponding relative score is then used to determine which items to work in a set of queues that has not yet been worked.

47 Claims, 10 Drawing Sheets

ATM FRAUD 251

| IDENTIFIER 254 | DETERMINATION VALUE 255 | MONETARY VALUE 260 |
|---|---|---|
| ATM$_1$ | TRUE | $100 |
| ATM$_2$ | TRUE | $200 |
| ATM$_3$ | FALSE | -$5 |
| . . . | . . . | . . . |
| ATM$_X$ | TRUE | $500 |

CHECK FRAUD 252

| IDENTIFIER 265 | DETERMINATION VALUE 275 | MONETARY VALUE 285 |
|---|---|---|
| CHECK$_1$ | FALSE | -$1,000 |
| CHECK$_2$ | FALSE | -$2,000 |
| CHECK$_3$ | TRUE | $3,000 |
| . . . | . . . | . . . |
| CHECK$_Y$ | TRUE | $100 |

CREDIT CARD FRAUD 253

| IDENTIFIER 270 | DETERMINATION VALUE 280 | MONETARY VALUE 290 |
|---|---|---|
| CREDIT CARD CHARGE$_1$ | FALSE | -$50 |
| CREDIT CARD CHARGE$_2$ | FALSE | -$500 |
| CREDIT CARD CHARGE$_3$ | TRUE | $25 |
| . . . | . . . | . . . |
| CREDIT CARD CHARGE$_Z$ | TRUE | $1,000 |

METHOD AND SYSTEM FOR ANALYZING AND OPTIMIZING DISTRIBUTION OF WORK FROM A PLURALITY OF QUEUES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR COMPUTER PROGRAM LISTING COMPACT DISC APPENDIX

Not applicable.

BACKGROUND OF THE INVENTION

The invention relates generally to queue management, and more specifically to a method and system for analyzing and optimizing the distribution of work from a plurality of queues.

In many business processes, an individual or team has an assigned list or queue of items to work through. There may be several queues containing different types of items to be worked. Often these queues are combined in non-systematic or ad hoc ways as it is different and not well understood how to correlate across queues containing different types of items. This results in the items from the different queues being ranked in an order that may not represent their true relative value or worth.

Each individual or team has a limited number of items that it is able to work within a given period of time. Also, while there may be a value associated with working an item, there is also cost associated with working each item. Given a set of resources, it is often the team manager's or some other individual's job to assess the different queues over time and to decide how to best work the queues and the items within the queues in order to achieve the highest return on investment for the business. As the number of types of items increases, this task becomes more difficult. Also, given there is a cost to work each item, the return on the business' investment in working items reduces as the value associated with an item reduces. It is also the responsibility of the team manager or another individual to decide which items in a queue should not be worked at all. Sometimes it may be cost beneficial and increase a business' return on investment not to work particular items within a queue. There is no automated process for optimizing how and whether the items among many sets of queues should be worked.

SUMMARY

According to one embodiment of the invention, it is appreciated that one industry that could benefit from optimizing work item queues is the banking industry. In particular, there are many types of fraud that fraudsters attempt to perpetrate upon the banking industry. Example fraud activities include ATM fraud, check fraud and credit card fraud. Each bank typically has a set of analysts tasked with identifying potential fraud activities and then working the identified list of potential fraud activities by investigating each activity to determine whether it is a fraudulent activity. Within the bank's set of analysts, there may be subsets of analysts tasked with working each type of fraud. For example, there may be sets of ATM fraud analysts, check fraud analysts and credit card fraud analysts. These analysts work to identify and prevent fraudulent transactions before money is transferred out of the bank. Many banks also have one or more systems or sets of tools that are used to generate lists of potential fraud activities. Analysts of the bank work the potential fraud activities identified on these lists. According to one embodiment, it is appreciated that a method for analyzing and optimizing the distribution of work from a plurality of queues may be beneficial in dealing with potential fraud activities.

There are many models known in the art for predicting whether an activity is a potential fraud activity and assigning a level of probability that an activity is a fraud activity. Traditionally, a manager of the fraud team must use these fraud models to determine which transactions are potentially fraudulent and decide how to best invest each fraud analyst's time to obtain the maximum return on investment for the bank. In certain situations, it may be beneficial not to investigate a particular potential fraud item. For example, it is appreciated that if the likelihood of the transaction being fraudulent is low, and the monetary value of the transaction is less than the cost to investigate the transaction, the bank may have a higher return on investment if it does not investigate a particular transaction. The bank may also invest the saved money in other areas, or invest their time in investigating transactions having higher value.

It is also appreciated that the number of fraud analysts and investigators in a department and the number of queue items worked is often determined based on a large, inflexible time scale with gross inflexible sizing. Similarly, the ongoing allocation of analysts to fraud queues is often based on historical losses at the bank in a fashion that does not allow for efficient short term (e.g., intraday) adjustment of resources. In addition, the current methods for allocating resources are far from optimal, as no quantitative attempt is made to compare the potential fraud alerts for different types of fraud to generate a master queue of potential fraud alerts to be investigated.

Aspects of the present invention relate generally to a method and system for analyzing and optimizing the distribution of work from a plurality of queues. Such queues may contain different types of data items. According to one embodiment, each of the data items has an associated monetary value and a potential impact if not worked. For example, there may be queue of potential ATM fraud activities, a queue of potential check fraud activities and a queue of potential credit card fraud activities. In one implementation, each of the data items in these queues has a monetary value if worked by an analyst, for example the value of the transaction, and is either a valid transaction or a fraudulent transaction.

According to one embodiment, historical data may be stored in a database, including sets of different types of data items. Each of the data items may have an associated monetary value. Continuing with the bank fraud example discussed above, data items may be stored associated with previously reviewed ATM fraud activities, check fraud activities and credit card fraud activities. Further, a relative score may be assigned to each of the data items within the sets. For instance, in the banking example, each of the fraud activities may be assigned a relative score. In one embodiment, the relative score is determined as a function of the likelihood that the potential fraud activity is actual fraud. A method according to one aspect of the invention may include calculating a cumulative monetary value for each relative score. In one embodiment, the cumulative monetary value for each relative score is calculated by aggregating the monetary values for all of the transactions having relative scores up to and including the relative score. In another embodiment, the cumulative monetary value is the summation of the monetary values for all items having relative scores less than and including the relative score.

The method may further include determining the maximum value of the cumulative monetary values calculated and its corresponding relative score. In one embodiment, the corresponding relative score is used to determine which items to work in a set of items that has not yet been worked. In the banking example, the relative score corresponding to the maximum cumulative monetary value would be used to identify which items in queues of potential fraud items to assign to analysts to investigate or work.

Another aspect of the present invention relates to a user interface of a fraud detection and work management system that indicates potential fraud items to a user, and indicates a relative score that indicates which potential fraud items should be worked. Such an interface may indicate a monetary value of a potential fraud item to the user. The interface may also present comparative information to the user in the interface that indicates which item(s) should be worked first, and in what priority.

One aspect of the invention provides an automated method for combining queues containing different types of items. Another aspect of the invention is to provide an automated method for determining which items in the different queues to work. Yet another aspect of the invention is to enable a business to focus on the items that statistically have the largest return on investment. Still another aspect of the invention is to enable businesses to efficiently and optimally allocate resources to work items in a group of queues.

According to one aspect of the present invention, a computer-implemented method for analyzing investment in time and resources in reviewing potential fraud activities is provided. The method comprises acts of (a) storing historical data in a database, the historical data comprising a first plurality of potential fraud items having a first type and a second plurality of potential fraud items having a second type, each of the first and second plurality of potential data items having a fraud determination and an associated monetary value, (b) assigning a relative score to each of the potential fraud items within the first and second plurality of fraud items, (c) calculating a cumulative monetary value for each relative score, the cumulative monetary value being the summation of associated monetary values for all potential fraud items having relative scores up to and including the relative score, and (d) determining a maximum cumulative monetary value and corresponding relative score. According to one embodiment of the present invention, the method further comprises an act of using the corresponding relative score to determine which potential fraud items in a set to analyze. According to another embodiment of the invention, the method further comprises an act of using the corresponding relative score to determine which potential fraud items in a plurality of sets to analyze. According to another embodiment of the invention, a historical fraud analyzer performs acts (a)-(d) and a current fraud analyzer performs an act of using the corresponding relative score to determine which potential fraud items in the set to analyze. According to another embodiment of the invention, the method further comprises an act of generating a graph of the cumulative monetary values as a function of relative score, prior to performing the act of determining the maximum cumulative value.

According to one embodiment of the present invention, the associated monetary value of potential fraud items having a positive fraud determination is a function of money saved in preventing a fraud event and a cost to investigate the potential fraud item. According to another embodiment of the invention, the associated monetary value of potential fraud items includes variable value, fixed costs and variable costs. According to another embodiment of the invention, the fixed costs include a system implementation cost, a system maintenance cost, and a human resource cost. According to another embodiment of the invention, the variable costs include a cost analyst's time, a false action rate and a cost of a false action. According to another embodiment of the invention, the variable value includes a savings if a value transfer is prevented, a probability preventing a value transfer when taking action, a rate of false inaction, and a cost associated with inaction. According to another embodiment of the invention, the associated monetary value of potential fraud items having a negative fraud determination is a function of a cost to investigate the potential fraud item. According to another embodiment of the invention, the act of assigning a relative score to each of the potential fraud items further comprises acts of assigning first numerical scores to each potential fraud item within the first plurality of fraud items, assigning second numerical scores to each potential fraud item within the second plurality of potential fraud items, applying a normalizing function to the second numerical scores to generate normalized numerical scores, and using the first numerical scores and the normalized numerical scores as the relative scores. According to another embodiment of the invention, the act of assigning a relative score to each of the potential fraud items further comprises an act of using a fraud detection model to detect fraud. According to another embodiment of the invention, the fraud detection model includes a normalizing function.

According to one embodiment of the present invention, the fraud detection model performs an act of generating a score for each of the potential fraud items. According to another embodiment of the invention, the method further comprises the act of approximating an anticipated return on investment value associated with analyzing for each of the plurality of potential fraud items. According to another embodiment of the invention, the act of determining the maximum cumulative monetary value and corresponding relative score further comprises an act of using the anticipated return on investment values. According to another embodiment of the invention, a first fraud detection model is used to assign relative scores to each potential fraud item within the first plurality of fraud items and a second fraud detection model is used to assign relative scores to each potential fraud item within the second plurality of fraud items. According to another embodiment of the invention, the first fraud detection model includes a first normalizing function and the second fraud detection model includes a second normalizing function. According to another embodiment of the invention, the method further comprises repeating acts (b)-(d) for a plurality of first fraud detection models to generate a plurality of maximum cumulative values and corresponding relative scores, and comparing the plurality of first fraud detection models using the plurality of maximum cumulative values and corresponding relative scores.

According to one embodiment of the present invention, the act of assigning a relative score to each of the potential fraud items further comprises acts of applying a series of normalizing functions to the second numerical scores to generate a series of normalized numerical scores, and generating a series of relative scores using the first numerical scores and the series of normalized numerical scores, and wherein the method further comprises the acts of repeating acts (c) and (d) for each of the series of relative scores to generate a series maximum cumulative monetary values and corresponding relative scores, and determining a greatest maximum cumulative monetary value and corresponding normalizing function. According to another embodiment of the invention, the method further comprises generating a graph of the series of maximum cumulative monetary values as a function of normalizing factor, prior to the act of determining the greatest maximum cumulative value. According to another embodiment of the invention, the act of using the corresponding relative score to determine which potential fraud items in the set to analyze further comprises selecting the potential fraud items in the set having a numerical score greater than or equal to the corresponding relative score for further analysis.

According to one embodiment of the present invention, the first type of fraud is selected from the group consisting of: first party fraud, third party fraud and collusive fraud. According to another embodiment of the invention, the second type of fraud is different than the first type of fraud and is selected from the group consisting of: first party fraud, third party fraud and collusive fraud. According to another embodiment of the invention, the method further comprises the act of using the maximum cumulative monetary value to modify the fraud detection model. According to another embodiment of the invention, the fraud detection model is defined using a plurality of parameters and wherein the act of using the maximum cumulative monetary value to modify the fraud detection model further comprises deforming at least one of the plurality of parameters to change the maximum cumulative monetary value. According to another embodiment of the invention, acts (a)-(d) are performed by a fraud detection system.

According to one aspect of the present invention, a system for analyzing investment in time and resources in reviewing potential fraud activities comprises a database adapted to store historical data, the historical data comprising a first plurality of potential fraud items having a first type and a second plurality of potential fraud items having a second type, each of the first and second plurality of potential data items having a fraud determination and an associated monetary value, a score generator adapted to assign a relative score to each of the potential fraud items within the first and second plurality of fraud items, a calculator adapted to calculate a cumulative monetary value for each relative score, the cumulative monetary value being the summation of associated monetary values for all potential fraud items having relative scores up to and including the relative score, and a component adapted to determine a maximum cumulative monetary value and corresponding relative score. According to one embodiment of the present invention, the system further comprises a queue generator adapted to determine, based on the corresponding relative score, an order of potential fraud items in a set to analyze. According to another embodiment of the invention, the system further comprises a current fraud analyzer that is adapted to use the corresponding relative score to determine which potential fraud items in the set to analyze. According to another embodiment of the invention, the system further comprises a component adapted to generate a graph of the cumulative monetary values as a function of relative score, prior to determining the maximum cumulative value. According to another embodiment of the invention, the system further comprises the associated monetary value of potential fraud items having a positive fraud determination is a function of money saved in preventing a fraud event and a cost to investigate the potential fraud item.

According to one embodiment of the present invention, the associated monetary value of potential fraud items includes variable value, fixed costs and variable costs. According to another embodiment of the invention, the fixed costs include a system implementation cost, a system maintenance cost, and a human resource cost. According to another embodiment of the invention, the variable costs include a cost analyst's time, a false action rate and a cost of a false action. According to another embodiment of the invention, the variable value includes a savings if a value transfer is prevented, a probability preventing a value transfer when taking action, a rate of false inaction, and a cost associated with inaction. According to another embodiment of the invention, the associated monetary value of potential fraud items having a negative fraud determination is a function of a cost to investigate the potential fraud item. According to another embodiment of the invention, the score generator is adapted to assign first numerical scores to each potential fraud item within the first plurality of fraud items, assign second numerical scores to each potential fraud item within the second plurality of potential fraud items, apply a normalizing function to the second numerical scores to generate normalized numerical scores, and use the first numerical scores and the normalized numerical scores as the relative scores. According to another embodiment of the invention, the score generator uses a fraud detection model to detect fraud. According to another embodiment of the invention, the fraud detection model includes a normalizing function. According to another embodiment of the invention, the fraud detection model performs an act of generating a score for each of the potential fraud items. According to another embodiment of the invention, the system further comprises a component adapted to approximate an anticipated return on investment value associated with analyzing for each of the plurality of potential fraud items. According to another embodiment of the invention, the component adapted to determine the maximum cumulative monetary value and corresponding relative score further comprises a component that determines an anticipated return on investment values.

According to one aspect of the present invention, a computer-readable medium comprising computer-executable instructions that, when executed on a processor of a server, perform a method for analyzing investment in time and resources in reviewing potential fraud activities is provided. The computer-readable medium comprises acts of (a) storing historical data in a database, the historical data comprising a first plurality of potential fraud items having a first type and a second plurality of potential fraud items having a second type, each of the first and second plurality of potential data items having a fraud determination and an associated monetary value, (b) assigning a relative score to each of the potential fraud items within the first and second plurality of fraud items, (c) calculating a cumulative monetary value for each relative score, the cumulative monetary value being the summation of associated monetary values for all potential fraud items having relative scores up to and including the relative score, and (d) determining a maximum cumulative monetary value and corresponding relative score.

According to one embodiment of the present invention, a computer system comprises a memory, a display, and a processor adaptively coupled to the memory and programmed to render a graphical user interface for analyzing investment in time and resources in reviewing potential fraud activities. The graphical user interface comprises a first display area configured to display a plurality of fraud items, wherein the first display area is adapted to display an ordered list of fraud items based on a monetary value determined for each of the respective plurality of fraud items. According to another embodiment of the present invention, the graphical user interface is adapted to display to a user an indication of at least one monetary value determined for at least one respective fraud item. According to another embodiment of the invention, the graphical user interface is adapted to display a cumulative monetary value for at least one of the plurality of fraud items. According to another embodiment of the invention, the graphical user interface is adapted to display cumulative monetary values for at least two respective ones of the plurality of fraud items, and wherein the graphical user interface is adapted to indicate a maximum monetary value among the displayed cumulative monetary values.

BRIEF DESCRIPTION OF THE DRAWINGS

The invention is pointed out with particularity in the appended claims. The above and further advantages of this invention may be better understood by referring to the following description taken in conjunction with the accompanying drawings, in which:

FIG. 2A is a pictorial view of an embodiment of a historical data database storing historical ATM fraud data, check fraud data and credit card fraud data;

Like reference characters in the respective drawn figures indicate corresponding parts.

DETAILED DESCRIPTION

Figure 1:
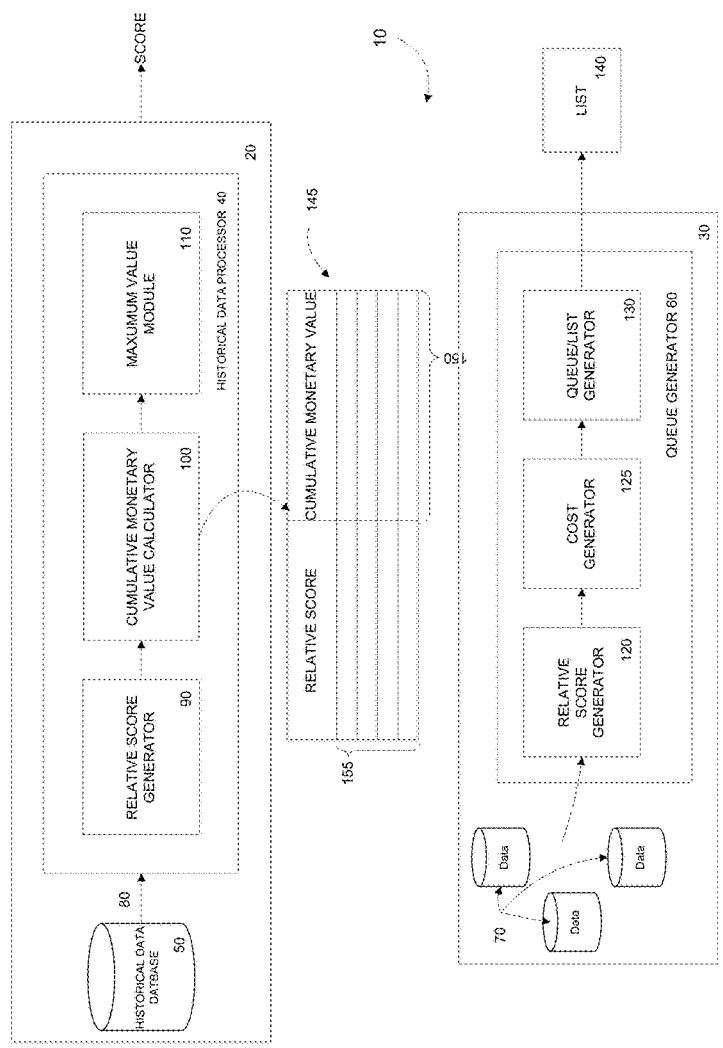
FIG. 1 is a block diagram of an embodiment of a system for analyzing and optimizing the distribution of work from a plurality of queues.

Referring to FIG. 1 and in brief overview, an embodiment of a system 10 constructed in accordance with the invention includes a historical data processing system 20 and a new and/or "yet to be worked" data processing system 30 that is configured to store and track items to be worked. The historical data processing system 20 includes a historical data processor 40 and a historical data database 50. The new data processing system 30 includes a queue generator 60 and a plurality of databases 70. In the embodiment shown, the historical data database 50 and the historical data processor 40 are connected via a communications link 80. Communications link 80 may be any type of communication system by which historical data database 50 and historical data processor 40 may communicate. For example, the historical data database 50 and the historical data processor 40 may communicate by a global communications network (e.g., Internet, intranet or any other type or combination of networks). In yet another embodiment, the historical data database 50 and the historical data processor 40 are parts of the same computer or form parts of a distributed computer system.

Figure 2:
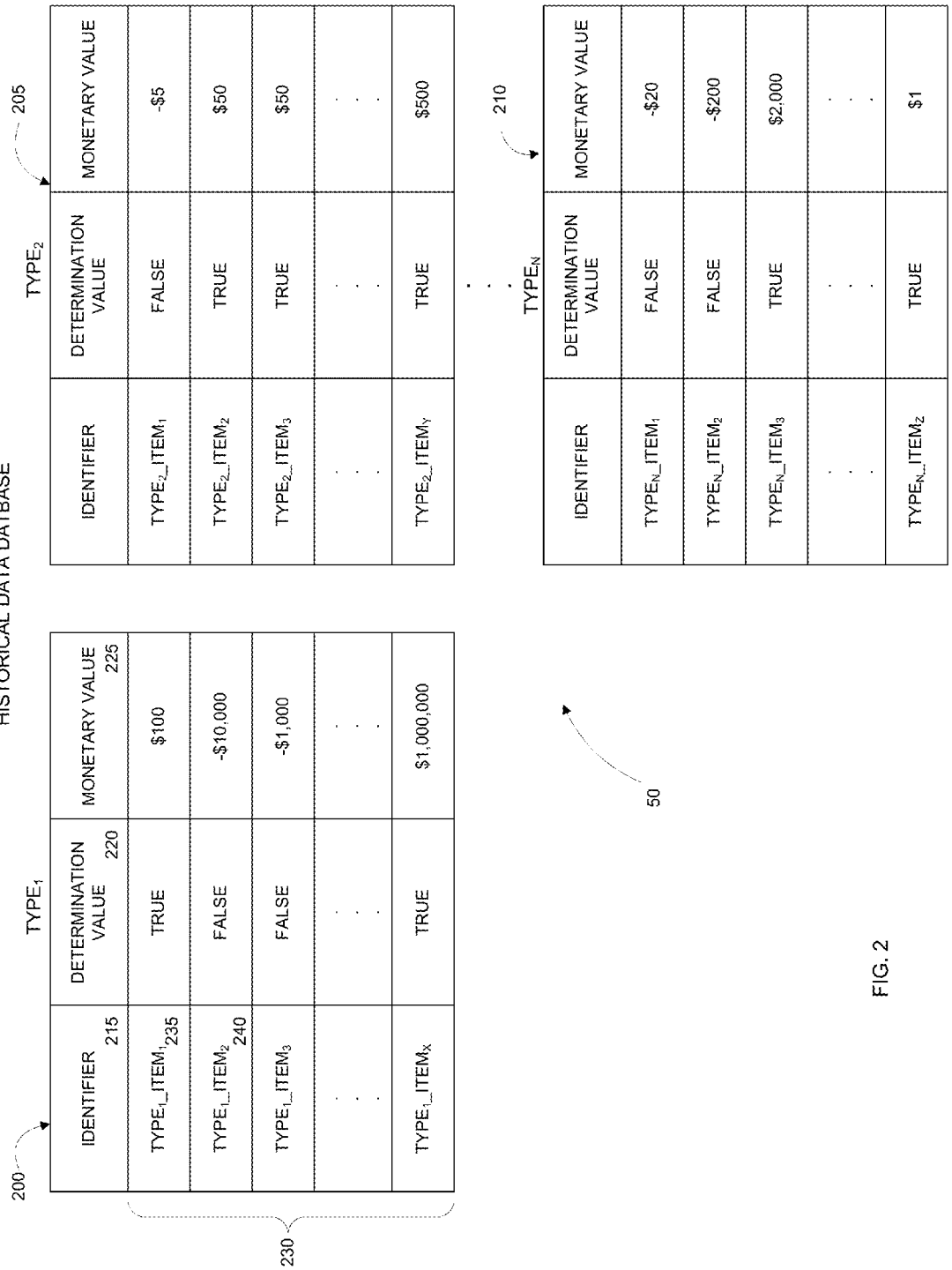
FIG. 2 is pictorial view of an embodiment of a historical data database and tables storing different types of data.

An embodiment of the historical data database 50 is shown in greater detail in FIG. 2. Historical data database 50 stores data that has been previously collected and analyzed. The historical data stored in the historical data database 50 is used to determine which data items to analyze in a set of data items that have not yet been analyzed in order to have the greatest return on investment.

According to one embodiment, historical database 50 may store data having a plurality of data types. In the example shown in FIG. 2, the historical data database 50 stores a plurality of data tables 200, 205 and 210, each of the plurality of data tables 200, 205 and 210 storing data having a different data type. Data may also be stored in lists, in a relational database, in an object-oriented database, in a spreadsheet, or in any other method known in the art for storing information.

The $Type_1$ data table 200 may include an identifier field 215, a determination value field 220 and a monetary value field 225 for the data items 230 stored in the table. For example, the first data item 235 may include a data identifier $Type_1\_Item_1$, a determination value of "true" and a monetary value of $100. Similarly, the second data item 240 may include a data identifier $Type_1\_Item_2$, a determination value of "false" and a monetary value of –$10,000. The remaining data tables, $Type_2$ data table 205 through the $Type_N$ data table 210, may also include identifiers, determination values and monetary values for each of the data items stored in the respective tables. In other embodiments, the data tables 200, 205, 210 may include more or less information for each data item.

FIG. 2A shows an embodiment of a historical data database 250 that may be used to store historical data regarding different types of fraud activities. As described above, there are many different types of bank fraud. In the embodiment shown, the historical data database 250 may include an ATM fraud table 251, a check fraud table 252 and a credit card fraud table 253. In other embodiments, historical data database 250 may include more or less tables for different types of fraud activities. For each of the fraud entries, ATM fraud table 251 may include a unique identifier 254, a fraud determination 255 and a monetary value 260. The unique identifier 254 may be an identifier assigned by the entity that provided the data for the historical data database 250 or it may be an identifier assigned by the system 10. In other embodiments, the unique identifier 254 may be a single identifier, or unique identifier 254 may be information describing the data item, such as ATM location, account number, transaction date, transaction amount, etc.

As described above, items in the historical data database 250 have been previously investigated. Therefore, each of the entries in the ATM fraud table 251 has been determined as a valid transaction or as a fraud activity. The ATM fraud table 251 may store this information in the fraud determination column 255. A value stored in the fraud determination column may be in the form of true/false, fraud/not fraud, a binary value, or any other value having two options to indicate whether a particular transaction was determined to be fraud.

ATM fraud table 251 also stores a monetary value 260 for each of the items in the table 251. Each of the items has an associated cost to investigate the item. In one embodiment, the monetary value is a function of variable value, fixed costs and variable costs. The costs include real-world costs, such as disruption of a customer's business, as well as monetary costs. The monetary fixed costs may include a system implementation cost, a system maintenance cost, and a human resource cost. In another embodiment, the variable costs may include a cost analyst's time, a false action rate and a cost of a false action. The costs may also vary depending on the size of the network to be investigated. For example, a larger network costs more to investigate. In yet another embodiment, the variable value includes a savings if a value transfer is prevented, a probability of preventing a value transfer when taking action, a rate of false inaction, and a cost associated with inaction.

Similar to the ATM fraud table 251, for each of the fraud entries, the check fraud table 252 and the credit card fraud table 253 may include a unique identifier 265, 270, a fraud determination 275, 280 and a monetary value 285, 290. Unique identifiers 265, 270 may be identifiers assigned by the entity that provided the data for the historical data database 250, such as the bank or credit card provider, or the identifiers may be assigned by the system 10. In other embodiments, the unique identifiers 265, 270 may be single numerical identifiers, or they may be information describing the data item. For example, the identifiers 265 for the check fraud table 252, may include the bank, the bank routing number, the checking account number, the check number, the amount of the transaction, the date of the transaction the payee, etc. Identifiers 270 for the credit card fraud table 253 may include the credit card issuer, the bank identifier, the credit card number, the credit card holder information, the date and time of the transaction, the location of the transaction, and any other data that may be associated with a credit card transaction.

Also similar to the ATM fraud table 251, each of the entries in the check fraud table 252 and the credit card fraud table 253 may have been determined to be a valid transaction or fraud activity. The check fraud table 252 and the credit card fraud table 253 may store this information in the fraud determination columns 275, 280, respectively. The value stored in the fraud determination column may be in the form of true/false, fraud/not fraud, a binary value, or any other value having two options capable of indicating whether an investigated transaction was fraud.

Finally, also similar to the ATM fraud table 251, the check fraud table 252 and the credit card fraud table 253 may store a monetary value 285, 290, respectively, for each of the entries.

Referring again to the block diagram of FIG. 1, the historical data processor 40 may include a relative score generator module 90, a cumulative monetary value calculator 100 and a maximum value module 110. The data from the historical data database 50 is the input to the relative score generator 90, and an output of a relative score determined by maximum value module 110 may be provided and used by queue generator 60 in determining an order of items in a queue.

The operation of the system 10 is described with reference to the flowchart of FIG. 3. In step 300, historical database 50 stores historical data items that have been previously analyzed. Next, in step 305, relative score generator 90 assigns a relative score to each of the data items stored by historical database 50. An embodiment of a process for assigning the relative scores will be described below with reference to FIGS. 4 and 5. In step 310, the cumulative monetary value calculator 100 calculates a cumulative monetary value for each of the relative scores. In one embodiment, the cumulative monetary value is determined as a function of a summation of all the monetary values associated with the data items having relative scores up to and including the relative score. In another embodiment, the cumulative monetary value is the summation of all the monetary values associated with the data items having relative scores less than and including the relative score.

In step 315, the maximum value module 110 determines the maximum cumulative monetary value calculated by the cumulative monetary value calculator 100 in step 310. The maximum value module 110 also determines the relative score associated with the maximum cumulative monetary value in step 320.

As described above, new data processing system 30 may include a queue generator 60 and a plurality of databases 70. The plurality of databases 70 provide input to the queue generator 60. As discussed, the plurality of databases 70 may collect and store data of different data types and provide different types of data to queue generator 60. Continuing with the bank fraud activity example, the plurality of databases 70 may collect and store potential ATM fraud items, potential check fraud items, potential credit card fraud items, etc. The potential fraud items in the plurality of databases 70 have not yet been analyzed to determine if they are in fact fraud. In another embodiment, the plurality of databases 70 may be a single database that stores the plurality of potential items to be analyzed. The queue generator 60 includes a relative score generator 120, a cost generator 125 and a queue or list generator 130. According to one embodiment, one function of the queue generator 60 includes determining which of the data items from the plurality of databases 70 to review in order to maximize the return on investment (ROI). In one embodiment, queue generator may determine an order by which individual data items may be processed to achieve such an ROI.

Figure 3:
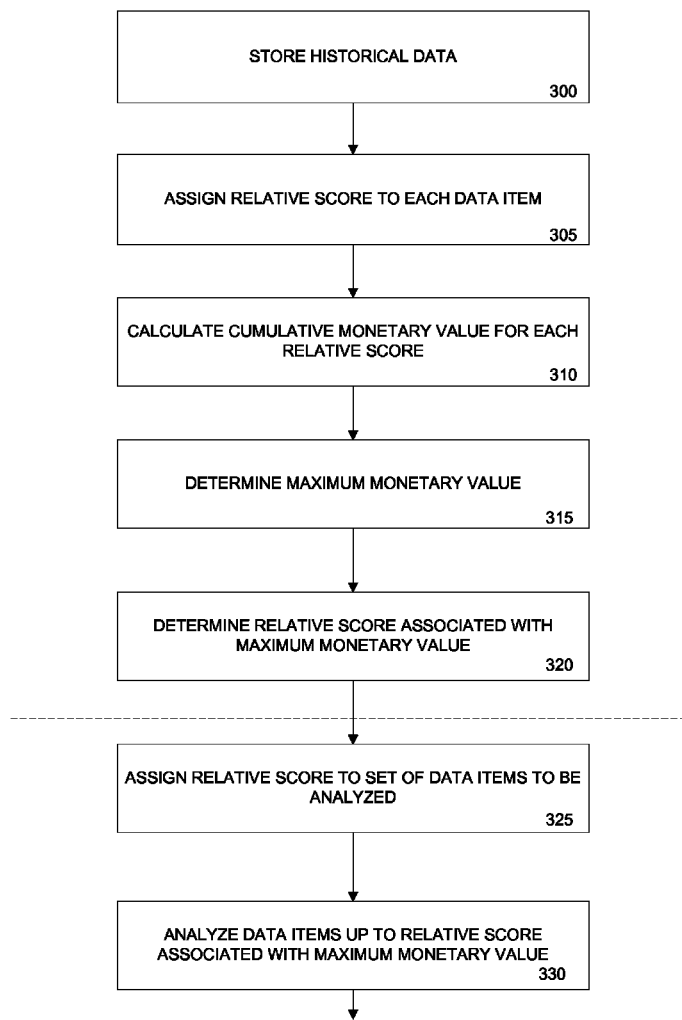
FIG. 3 is a flowchart representation of an embodiment of a process for analyzing and optimizing the distribution of work from a plurality of queues.

Returning to the flowchart of FIG. 3, in step 325, relative score generator 120 generates a relative score for each of the data items from the plurality of databases 70. An embodiment of a process for assigning the relative scores will be described below with reference to FIGS. 4 and 5. In another embodiment, relative score generator 120 is capable of generating a relative score for each of the data items from the plurality of databases 70 at any time, and is independent of any processing by historical data processor 20. In one embodiment, cost generator 125 determines the monetary value associated with each of the data items.

In step 330, the list generator 130 uses the relative score associated with the maximum cumulative monetary value that was determined in step 320 to determine which of the data items from the plurality of databases 70 should be analyzed in order to have the maximum return on investment. In one embodiment, list generator 130 generates a list 140 that contains all of the data items having a relative score up to and including the relative score associated with the maximum cumulative monetary value that was determined in step 320. In another embodiment, the list generator 130 generates a list 140 that contains all of the data items having a relative score less than and including the relative score associated with the maximum cumulative monetary value that was determined in step 320. If worked, data items not included on the list 140 generated by the list generator 130 will lower the overall return on investment realized by the business.

Figure 4:
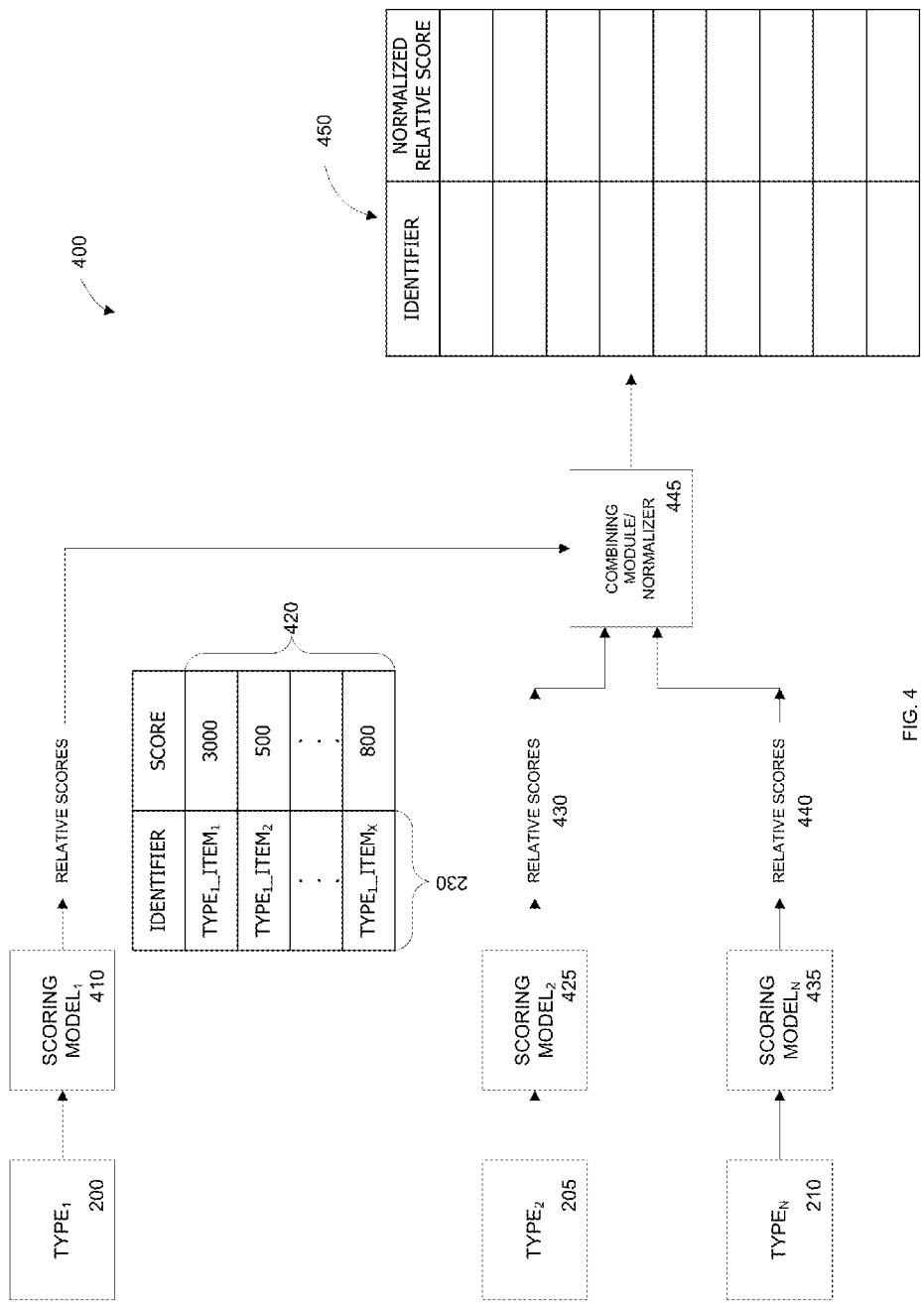
FIG. 4 is a block diagram of an embodiment of a system for generating a set of ranked queues and combining the queues into a single ranked queue.

As described above in the discussion of FIGS. 2 and 2A, the data items stored in the historical data database 50 may have different data types. FIG. 4 shows a block diagram of an embodiment of a system for generating a set of ranked queues and combining the queues into a single ranked queue. FIG. 4 shows an embodiment of a process 400 for assigning the relative scores to data items having different data types. Each of the data items 230 from the $Type_1$ data table 200 are processed through a scoring $model_1$ 410. Scoring $model_1$ 410 assigns a relative score 420 to each of the data items 230 based on the properties and/or attributes of the data items 230. One purpose of the relative scores is to rank each of the data items 230 within the list in order of priority or worth. In one embodiment, the data items having a higher relative score have a higher priority or worth. In another embodiment, the data items having a lower relative score have a lower priority or worth. In yet another embodiment, data items may be assigned the same relative score. In still another embodiment, each data item is required by the system to have a unique relative score.

Similarly, scoring model$_2$ 425 may assign relative scores 430 to the data items in the Type$_2$ data table 205 and the scoring model$_N$ 435 assigns relative scores 440 to the data items in the Type$_N$ data table 210. Scoring models 410, 425 and 435 may be the same or different models. As the data items in the Type$_1$ 200, Type$_2$ 205 through Type$_N$ 210 data tables are different types and therefore have different attributes and properties, it is likely that the scoring models 410, 425 and 435 will be different. Any model known in the art for assigning relative scores to a list of items may be used by the system 10.

Continuing the bank fraud activity example, the Type$_1$ table 200 may be the ATM fraud table 251, the Type$_2$ table 205 may be the check fraud table 252 and the Type$_N$ table 210 may be the credit card fraud table 253 The scoring model$_1$ 410 assigns a priority, rank or score to each item in the ATM fraud table 251; the scoring model$_2$ assigns a priority, rank or score to each item in the check fraud table 252 and the scoring model$_N$ assigns a priority, rank or score to each item in the credit card fraud table 253. The priority, rank or score creates an ordered ranking indicating which items have a higher return on investment and should be analyzed for potential fraud.

As ATM fraud, check fraud and credit card fraud have different attributes or properties, different models may be used to assign a relative score to each item within each set. In one embodiment, the scoring models may include fraud detection models which identify the potential of a particular activity being a fraud activity. In another embodiment, the scoring model makes use the monetary value associated with a data item to assign its relative score. In other embodiments, other elements may be used to assign the relative scores. Examples of known fraud detection models that may be used include neural net-based fraud models, Bayesian networks and rules-based models. However, any appropriate fraud detection model known in the art may be used.

While the relative scores within a set make sense relative to other items within the same set, the relative scores may not have meaning for items between sets. For example, while the priority of each item within each type of fraud set is now determined, it may be still necessary to create an overall priority or ranked list of every data item. The combining module (also referred to herein as "normalizer") 445 combines the sets of relative scores 420, 430, 440 from each of the scoring models 410, 425, 435 into a single set of relative scores 450. Continuing the fraud example from above, the combining module 445 combines the ATM fraud relative scores, the check fraud relative scores and the credit card relative scores to create a single list ranking each fraud item with respect to every other fraud item.

Figure 5:
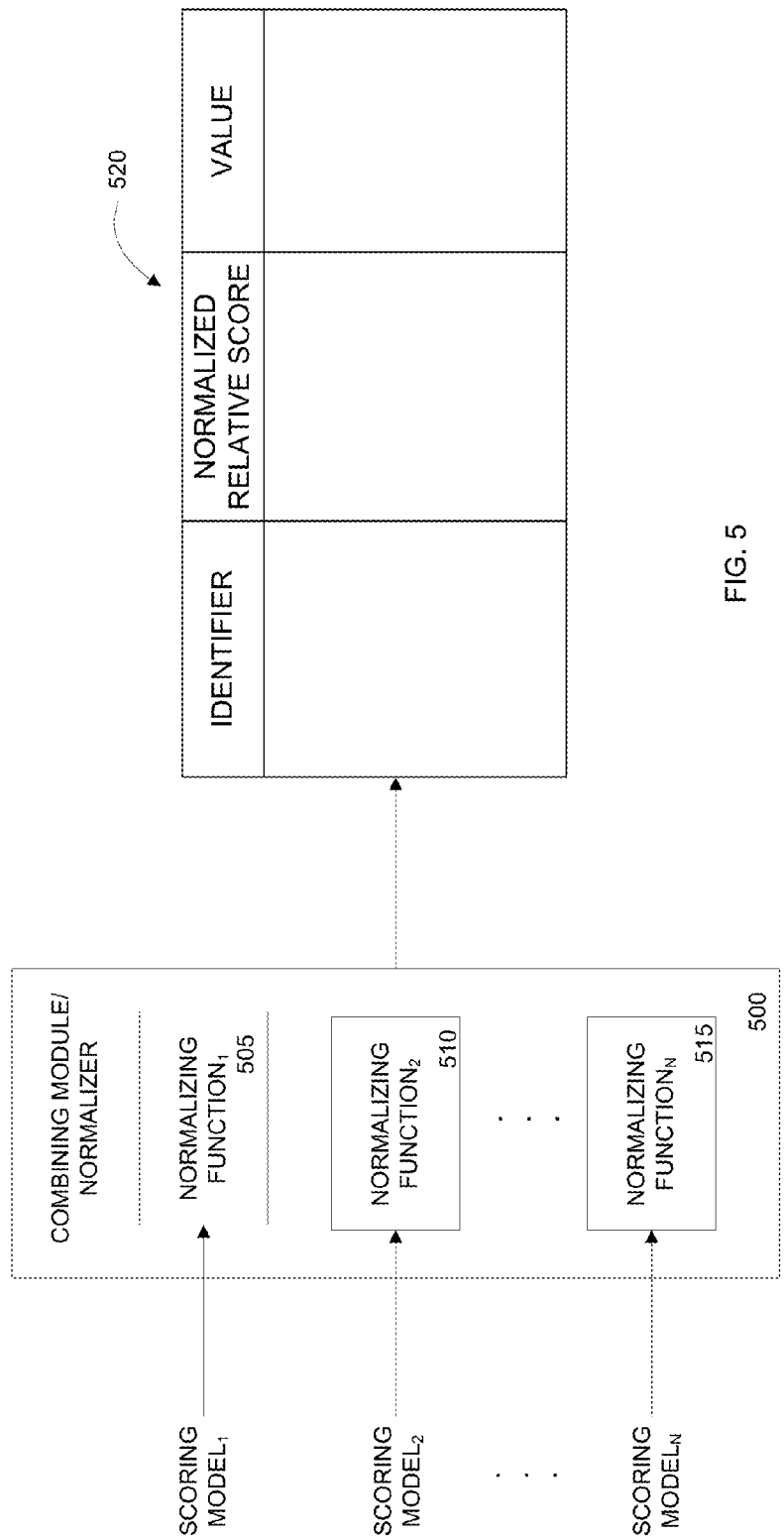
FIG. 5 is a block diagram of an embodiment of a system for combining sets of ranked queues into a single ranked queue.

FIG. 5 shows a block diagram of one embodiment of a combining module 500 according to one aspect of the present invention. The combining module 500 includes normalizing function$_1$ 505; and normalizing function$_2$ 510 through the normalizing function$_N$ 515. In another embodiment, the normalizing functions are part of the scoring models. Outputs from the scoring model$_1$ 410, the scoring model$_2$ 425 through the scoring model$_N$ 435 are provided as input to normalizing function$_1$ 505, normalizing function$_2$ 510 through the normalizing function$_N$ 515, respectively. Normalizing functions 505, 510, 515 may be the same or different functions. In one embodiment, normalizing functions 505, 510, 515 are normalizing factors. In other embodiments, normalizing functions 505, 510, 515 may be any function known in the art to normalize values. Output from the combining module 500 may be provided as a list or table 520 of all the data items of all the different data types, each with a normalized relative score.

As described above in the discussion of FIGS. 2 and 2A, each of the data items may have an associated monetary value. Referring again to FIG. 1, once the normalized relative scores are generated, the cumulative monetary value calculator 100 generates a cumulative monetary value for each relative score, as shown in table 145. In one embodiment, the cumulative monetary value may be determined as a summation of all the monetary values associated with the data items having relative scores up to and including the relative score. In another embodiment, the cumulative monetary value is the summation of all the monetary values associated with the data items having relative scores less than and including the relative score. Next, the maximum value module 110 determines the maximum cumulative monetary value calculated by the cumulative monetary value calculator 100. The maximum value module 110 also determines the relative score associated with the maximum cumulative monetary value.

Figure 6:
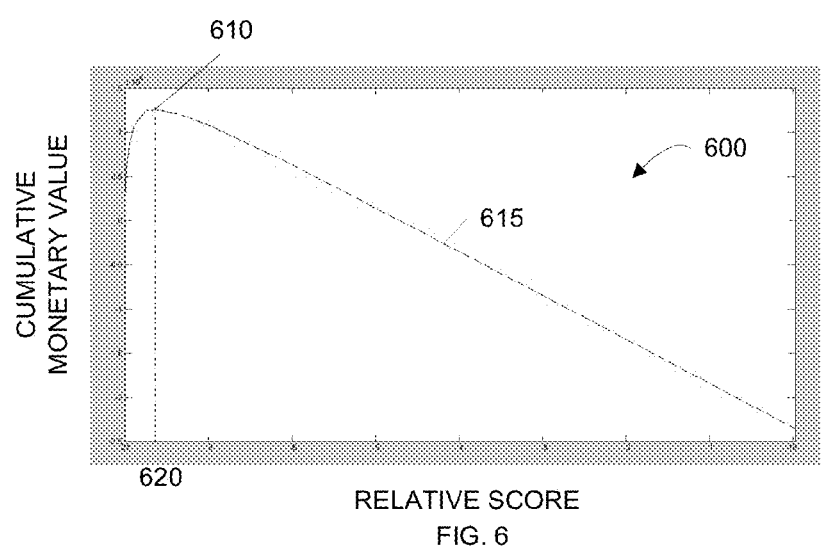
FIG. 6 is a pictorial view of a graph of cumulative monetary value as a function of relative score.

In one embodiment, the maximum value module 110 generates a graph of the cumulative monetary values 150 as a function of the relative scores 155. FIG. 6 shows an example graph 600 of relative score 155 versus cumulative value 150. In another embodiment, the graph is of the number of items worked versus cumulative value. As the items in a queue are ranked and ordered based on their relative score, the number of items worked may be correlated to the relative score values. The maximum value module 110 determines the maximum value 610 of the curve 615, and its associated normalized relative score 620. The normalized relative score 620 is the score that will be used by the list generator 130 of the new data processing system 30 described above in the discussion of FIG. 1.

The curve 615 is also referred to herein as the "Return on Investment Curve" or "ROIC". The curve 615 models the return on investment over time when working or investigating the historical data queues as a function of the number of items worked. This allows for the assignment of an optimal number of items from a queue each day and over time. In one embodiment, the items having a relative score up to and including the relative score associated with the maximum cumulative monetary value are assigned to be worked. In another embodiment, data items having a relative score less than and including the relative score associated with the maximum cumulative monetary value are assigned to be worked. This use of relative score may also allow a resource to be moved from a queue of one type of data item to another type, even on a short term time period (e.g., an intraday scale).

For example, if there are more of one type of data item than another having relative scores greater than the relative score associated with the maximum cumulative monetary value, then more resources should be assigned to that data type. Continuing with the bank fraud example, if there are more ATM fraud items than check fraud items having relative scores greater than the relative score associated with the maximum cumulative monetary value, then more analysts should be assigned to investigate the ATM fraud items. In summary, using multiple ROICs in tandem, and combining all queue items into a single queue ranked by their relative expected return on investment, a manager can compare the value of working disparate queue items. The invention therefore allows for optimal cross-queue item assignment.

Figure 7:
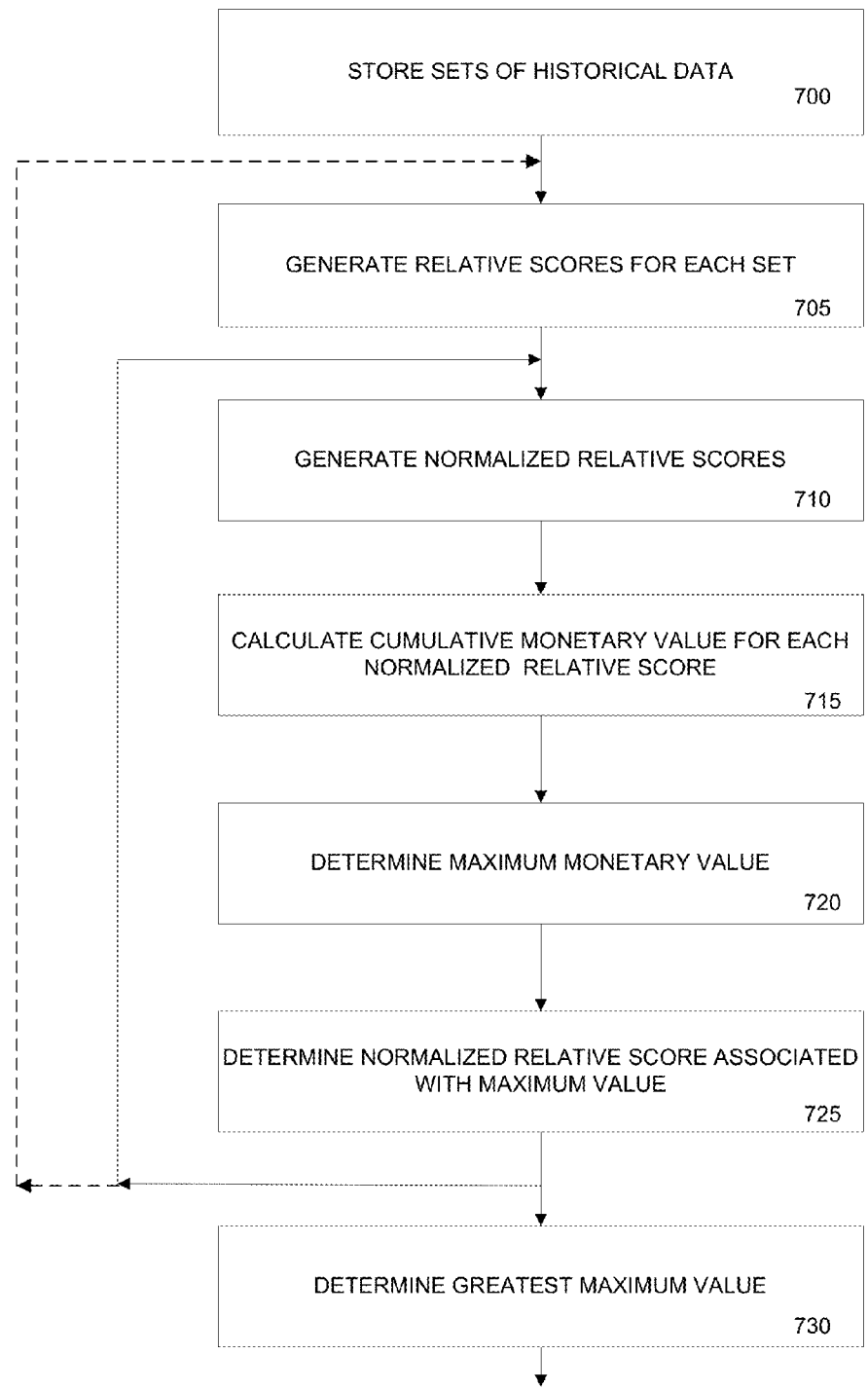
FIG. 7 is a flowchart representation of an embodiment of a process for adjusting the normalizing function used to combine the sets of ranked queues into a single ranked queue to generate the greatest return on investment.

One aspect of the present invention is to maximize the return on investment of time and resources in investigating or working queue items. In one embodiment of the invention, an iterative process is used to determine the normalizing functions used by the combining module 500 in order to generate a higher return on investment. The operation of the historical data processing system 20 when used to adjust the normalizing functions is described with reference to FIG. 7. In step 700, the historical database 50 stores historical data items that have been previously analyzed. Next, in step 705, the relative score generator 90 assigns a relative score to each of the data items within each of the sets of data types stored in the historical database 50. In step 710, the combining module 500 generates normalized relative scores for a first set of normalizing functions 505, 510, 515. The cumulative monetary value calculator 100 then calculates a cumulative monetary value for each of the normalized relative scores in step 715, as described above.

Next, in step 720, the maximum value module 110 determines the maximum cumulative monetary value calculated by the cumulative monetary value calculator 100 in step 715. The maximum value module 110 also determines the relative score associated with the maximum cumulative monetary value in step 725. The process then returns to step 710 and repeats steps 710 through 725 for a plurality of different normalizing functions. Once the maximum monetary value has been determined for the combining module using a plurality of different normalizing functions, the process proceeds to step 730. In step 730, the system determines the greatest maximum monetary value and the set of normalizing functions associated with the greatest maximum monetary value. This set of normalizing functions is then used by the relative score generator 120 of the queue generator 60 to generate normalized relative scores for the data from the plurality of databases 70.

Figure 7A:
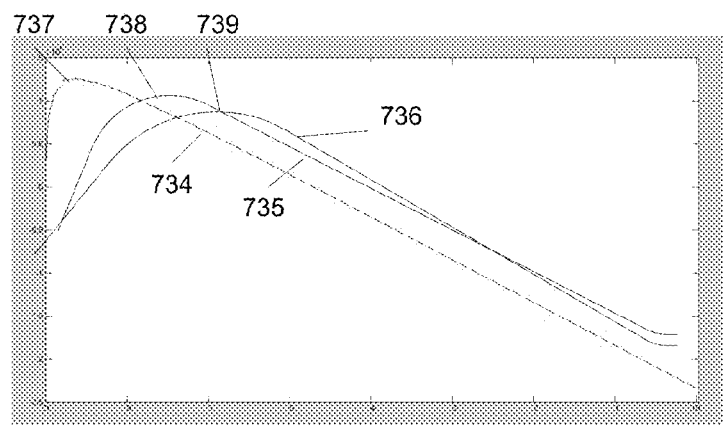
FIG. 7A is a pictorial view of a graph of cumulative monetary value as a function of relative score for different normalizing factors.
Figure 8:
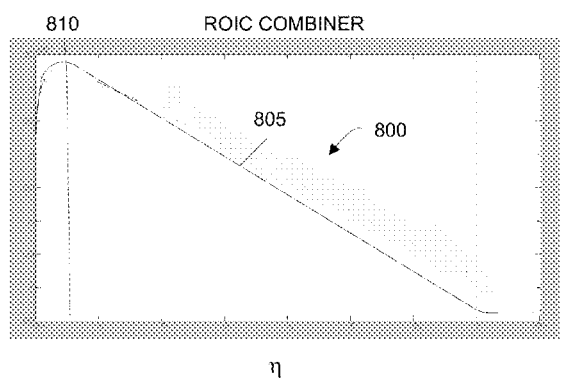
FIG. 8 is a pictorial view of a screenshot showing a graph of the maximum values of the curves in FIG. 7A as a function of normalizing factor.

In one embodiment in which the maximum value module 110 generates a graph of the cumulative values 145 as a function of the relative scores 155, the output of step 725 is a series of curves, one for each set of normalizing functions. FIG. 7A shows example graphs 731, 732, 733 of relative score versus cumulative value for different sets of normalizing functions. Each of the curves 734, 735, 736 has an associated maximum value 737, 738, 739, respectively. In one embodiment, the normalizing function is a normalizing factor. In one such embodiment, a curve combiner then generates a graph 800 of the maximum value of each of the return on investment curves (ROICs) 734, 735, 736 as a function of a normalizing factor η. An example graph 800 is shown in FIG. 8. The curve 805 has a maximum value 810, which has an associated normalizing factor η 815. According to one embodiment, normalizing factor η 815 is the normalizing function that is used by the relative score generator 120 in generating normalized relative scores for the data from the plurality of databases 70. In addition, the normalized relative score 620 associated with the maximum value of the curve generated for the normalizing factor η 815 is the score that is used by the list generator 130 of the new data processing system 30 as described above in the discussion of FIG. 1.

Historical data processing system 20 may also be used to evaluate different scoring models. Referring again to the flowchart of FIG. 7, rather than returning to step 710 and repeating steps 710 through 725 for a plurality of different normalizing functions, after step 725, the process returns to step 705 as indicated by the dashed line and repeats steps 705 through 725 for a plurality of scoring models. Once the maximum monetary value has been determined for a plurality of different scoring models, the process proceeds to step 730. In step 730, the system determines the greatest maximum monetary value and the scoring model associated with the greatest maximum monetary value. This scoring model is then used by the relative score generator 120 of the queue generator 60 to generate normalized relative scores for the data from the plurality of databases 70. Continuing the banking fraud example, in this embodiment, the historical data stored in the historical data database 50 can be used to evaluate the effectiveness of the scoring models in predicting fraud as the fraud determination has already been made. The ROICs may also be used to adjust the scoring models and to compare different models in order to select which model to apply to which type of data.

Aspects of the present invention has many advantages over the prior art solutions. First, according to certain embodiments, the ability is provided to learn from a history of data items and apply the learning to day-to-day activities. Second, according to the some embodiments, an ability to combine queues containing different data types is provided. Third, the ability to optimize the distribution of work from a plurality of queues is provided. By optimizing the distribution of work, certain aspects of the invention optimize the value attained from working items in the queues. Fourth, certain embodiments provide the ability for a manager to determine how far down a ranked queue the team should work. Thus, a business may more adequately focus on the items that statistically have the highest return on investment. By determining which items have a higher return on investment to work, the efficiency of the team and of each individual is improved. Fifth, certain embodiments may assist with staffing decisions, as the average number of items/cases to investigate or work per day can be predicted. Finally, an ability may be provided to predict the business' annual return on investment and the amount of money the business may be expected to save per year. Further, return on investment determinations for multiple fraud detection models may be used to compare the effectiveness of such models to one another, and may be used as a tool to assess such models. For instance, an ability may be provided to compare one or more fraud detection models using maximum cumulative values and corresponding relative scores.

While the application of various aspects of the invention to analyzing and optimizing the distribution of work from a plurality of potential bank fraud queues has been described in detail, it will now be apparent to one of skill in the art that aspects of the invention may be applied to any lists or queues of items that need to be gone through or processed. For example, other industries in which the invention may be applied include quality assurance, advertising, medical testing and insurance. In quality assurance, there are often more items to be tested than time or resources allow. An embodiment according to the present invention may be used to determine which items should be tested. In the advertising industry, there are more potential avenues for advertising campaigns than a budget may allow. An embodiment of the system according to the present invention may be used to determine which advertising mechanisms will have the greatest return on investment. In the medical industry, there may be more testing options or procedures than insurance or a patient is able to afford. An embodiment of the system according to the present invention may be used to determine which tests or procedures may have the most benefit to the patient. These industries are for example purposes only, and do not include all the industries to which the invention may be applied. Further, although various aspects of the present invention may be applied to banking fraud detection systems, it should be appreciated that other types of fraud detection systems (e.g., prescription fraud) may also benefit by various improvements described herein.

The techniques described above can be implemented in digital electronic circuitry, or in computer hardware, firmware, software executing on a computer, or in combinations of them. The techniques can be implemented as a computer program product, i.e., a computer program tangibly embodied in tangible, machine-readable storage medium, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions described herein by operating on input data and generating output. Method steps can also be performed by, and apparatus of the invention can be implemented as, special purpose logic circuitry, e.g., an FPGA (field programmable gate array) or an ASIC (application-specific integrated circuit). Applications can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Storage media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A computing system implementing the invention can include clients and servers. A client and server are generally remote from each other and typically interact over a communication network. The relationship of client and server arises by virtue of computer programs running on the respective computers and having a client-server relationship to each other.

Having described various embodiments of the invention, it will now become apparent to one of skill in the art that other embodiments incorporating the concepts may be used. For example, although the contents of this document describe the application of this invention to mobile phones, it is potentially applicable to a variety of mobile devices. It is felt, therefore, that these embodiments should not be limited to the disclosed embodiments, but rather should be limited only by the spirit and scope of the following claims.

What is claimed is:

1. A computer-implemented method for analyzing investment in time and resources in reviewing potential fraud activities, comprising acts of:
   (a) storing historical data in a database, the historical data comprising a first plurality of potential fraud items having a first type and a second plurality of potential fraud items having a second type, each of the first and second plurality of potential data items having a fraud determination and an associated monetary value, wherein the associated monetary value of each potential fraud item having a positive fraud determination is a function of savings in preventing a fraud event and a related cost of investigation;
   (b) assigning a relative score to each of the potential fraud items within the first and second plurality of fraud items;
   (c) calculating, using at least one processor, a cumulative monetary value for each relative score, the cumulative monetary value being the summation of associated monetary values for all potential fraud items having relative scores up to and including the relative score; and
   (d) determining a maximum cumulative monetary value and corresponding relative score.

2. The method of claim 1, further comprising an act of using the corresponding relative score to determine which potential fraud items in a set to analyze.

3. The method of claim 2, further comprising an act of using the corresponding relative score to determine which potential fraud items in a plurality of sets to analyze.

4. The method of claim 2, wherein a historical fraud analyzer performs the acts of storing, assigning, calculating, and determining and a current fraud analyzer performs an act of using the corresponding relative score to determine which potential fraud items in the set to analyze.

5. The method of claim 1, further comprising an act of generating a graph of the cumulative monetary values as a function of relative score, prior to performing the act of determining the maximum cumulative value.

6. The method of claim 1, wherein the associated monetary value of potential fraud items includes variable value, fixed costs, and variable costs.

7. The method of claim 6, wherein the fixed costs include a system implementation cost, a system maintenance cost, and a human resource cost.

8. The method of claim 6, wherein the variable costs include a cost analyst's time, a false action rate, and a cost of a false action.

9. The method of claim 6, wherein the variable value includes a savings if a value transfer is prevented, a probability preventing a value transfer when taking action, a rate of false inaction, and a cost associated with inaction.

10. The method of claim 1, wherein the associated monetary value of potential fraud items having a negative fraud determination is a function of a cost to investigate the potential fraud item.

11. The method of claim 1, wherein the act of assigning a relative score to each of the potential fraud items further comprises acts of:
    assigning first numerical scores to each potential fraud item within the first plurality of fraud items;
    assigning second numerical scores to each potential fraud item within the second plurality of potential fraud items;
    applying a normalizing function to the second numerical scores to generate normalized numerical scores; and
    using the first numerical scores and the normalized numerical scores as the relative scores.

12. The method of claim 1, wherein the act of assigning a relative score to each of the potential fraud items further comprises an act of using a fraud detection model to detect fraud.

13. The method of claim 12, wherein the fraud detection model includes a normalizing function.

14. The method of claim 12, wherein the fraud detection model performs an act of generating a score for each of the potential fraud items.

15. The method of claim 14, further comprising the act of approximating an anticipated return on investment value associated with analyzing for each of the plurality of potential fraud items.

16. The method of claim 15, wherein the act of determining the maximum cumulative monetary value and corresponding relative score further comprises an act of using the anticipated return on investment values.

17. The method of claim 12, wherein a first fraud detection model is used to assign relative scores to each potential fraud item within the first plurality of fraud items and a second fraud detection model is used to assign relative scores to each potential fraud item within the second plurality of fraud items.

18. The method of claim 17, wherein the first fraud detection model includes a first normalizing function and the second fraud detection model includes a second normalizing function.

19. The method of claim 17, further comprising:
repeating the acts of assigning, calculating, and determining, for a plurality of first fraud detection models to generate a plurality of maximum cumulative values and corresponding relative scores; and
comparing the plurality of first fraud detection models using the plurality of maximum cumulative values and corresponding relative scores.

20. The method of claim 11, wherein the act of assigning a relative score to each of the potential fraud items further comprises acts of:
applying a series of normalizing functions to the second numerical scores to generate a series of normalized numerical scores; and
generating a series of relative scores using the first numerical scores and the series of normalized numerical scores; and
wherein the method further comprises the acts of:
repeating the acts of calculating and determining for each of the series of relative scores to generate a series maximum cumulative monetary values and corresponding relative scores; and
determining a greatest maximum cumulative monetary value and corresponding normalizing function.

21. The method of claim 20, further comprising generating a graph of the series of maximum cumulative monetary values as a function of normalizing factor, prior to the act of determining the greatest maximum cumulative value.

22. The method of claim 2, where in the act of using the corresponding relative score to determine which potential fraud items in the set to analyze further comprises selecting the potential fraud items in the set having a numerical score greater than or equal to the corresponding relative score for further analysis.

23. The method of claim 1, wherein the first type of fraud is selected from the group consisting of: first party fraud, third party fraud, and collusive fraud.

24. The method of claim 23, wherein the second type of fraud is different than the first type of fraud and is selected from the group consisting of: first party fraud, third party fraud, and collusive fraud.

25. The method of claim 12, further comprising the act of using the maximum cumulative monetary value to modify the fraud detection model.

26. The method of claim 25, wherein the fraud detection model is defined using a plurality of parameters and wherein the act of using the maximum cumulative monetary value to modify the fraud detection model further comprises deforming at least one of the plurality of parameters to change the maximum cumulative monetary value.

27. The method according to claim 1, wherein the acts of storing, assigning, calculating, and determining are performed by a fraud detection system.

28. A system for analyzing investment in time and resources in reviewing potential fraud activities, comprising:
a database adapted to store historical data, the historical data comprising a first plurality of potential fraud items having a first type and a second plurality of potential fraud items having a second type, each of the first and second plurality of potential data items having a fraud determination and an associated monetary value, wherein the associated monetary value of each potential fraud item having a positive fraud determination is a function of savings in preventing a fraud event and a related cost of investigation;
a score generator, implemented on at least one processor, adapted to assign a relative score to each of the potential fraud items within the first and second plurality of fraud items;
a calculator, implemented on the at least one processor, adapted to calculate a cumulative monetary value for each relative score, the cumulative monetary value being the summation of associated monetary values for all potential fraud items having relative scores up to and including the relative score; and
a component, implemented on the at least one processor, adapted to determine a maximum cumulative monetary value and corresponding relative score.

29. The system of claim 28, further comprising a queue generator adapted to determine, based on the corresponding relative score, an order of potential fraud items in a set to analyze.

30. The system of claim 28, further comprising a current fraud analyzer that is adapted to use the corresponding relative score to determine which potential fraud items in the set to analyze.

31. The system of claim 28, further comprising a component adapted to generate a graph of the cumulative monetary values as a function of relative score, prior to determining the maximum cumulative value.

32. The system of claim 28, wherein the associated monetary value of potential fraud items includes variable value, fixed costs, and variable costs.

33. The system of claim 32, wherein the fixed costs include a system implementation cost, a system maintenance cost, and a human resource cost.

34. The system of claim 32, wherein the variable costs include a cost analyst's time, a false action rate, and a cost of a false action.

35. The system of claim 32, wherein the variable value includes a savings if a value transfer is prevented, a probability preventing a value transfer when taking action, a rate of false inaction, and a cost associated with inaction.

36. The system of claim 28, wherein the associated monetary value of potential fraud items having a negative fraud determination is a function of a cost to investigate the potential fraud item.

37. The system of claim 28, wherein the score generator is adapted to:
assign first numerical scores to each potential fraud item within the first plurality of fraud items;
assign second numerical scores to each potential fraud item within the second plurality of potential fraud items;
apply a normalizing function to the second numerical scores to generate normalized numerical scores; and
use the first numerical scores and the normalized numerical scores as the relative scores.

38. The system of claim 28, wherein the score generator uses a fraud detection model to detect fraud.

39. The system of claim 38, wherein the fraud detection model includes a normalizing function.

40. The system of claim 38, wherein the fraud detection model performs an act of generating a score for each of the potential fraud items.

41. The system of claim 40, further comprising a component adapted to approximate an anticipated return on investment value associated with analyzing for each of the plurality of potential fraud items.

42. The system of claim 41, wherein the component adapted to determine the maximum cumulative monetary value and corresponding relative score further comprises a component that determines an anticipated return on investment values.

43. A non-transitory computer-readable medium comprising computer-executable instructions that, when executed on a processor of a server, perform a method for analyzing investment in time and resources in reviewing potential fraud activities, comprising acts of:
(a) storing historical data in a database, the historical data comprising a first plurality of potential fraud items having a first type and a second plurality of potential fraud items having a second type, each of the first and second plurality of potential data items having a fraud determination and an associated monetary value, wherein the associated monetary value of each potential fraud item having a positive fraud determination is a function of savings in preventing a fraud event and a related cost of investigation;
(b) assigning a relative score to each of the potential fraud items within the first and second plurality of fraud items;
(c) calculating a cumulative monetary value for each relative score, the cumulative monetary value being the summation of associated monetary values for all potential fraud items having relative scores up to and including the relative score; and
(d) determining a maximum cumulative monetary value and corresponding relative score.

44. A computer system comprising:
a memory;
a display; and
a processor adaptively coupled to the memory, wherein the processor is programmed to render a graphical user interface on the display for analyzing investment in time and resources in reviewing potential fraud activities, the graphical user interface comprising:
a first display area configured to display a plurality of fraud items, wherein the first display area is adapted to display an ordered list of fraud items based on a monetary value determined for each of the respective plurality of fraud items, wherein the associated monetary value of each potential fraud item having a positive fraud determination is a function of savings in preventing a fraud event and a related cost of investigation.

45. The computer system according to claim 44, wherein the graphical user interface is adapted to display to a user an indication of at least one monetary value determined for at least one respective fraud item.

46. The computer system according to claim 44, wherein the graphical user interface is adapted to display a cumulative monetary value for at least one of the plurality of fraud items.

47. The computer system according to claim 44, wherein the graphical user interface is adapted to display cumulative monetary values for at least two respective ones of the plurality of fraud items, and wherein the graphical user interface is adapted to indicate a maximum monetary value among the displayed cumulative monetary values.

* * * * *

UNITED STATES PATENT AND TRADEMARK OFFICE
CERTIFICATE OF CORRECTION

PATENT NO. : 8,412,563 B2
APPLICATION NO. : 12/829854
DATED : April 2, 2013
INVENTOR(S) : Robert C. Taintor and Gregory David Leibon It is certified that error appears in the above-identified patent and that said Letters Patent is hereby corrected as shown below:

In the Claims:

Claim 20, col. 17, lines 49-50, "generate a series maximum" should read --generate a series of maximum--

Claim 22, col. 17, line 59, "where in" should read --wherein--

Signed and Sealed this
Sixteenth Day of July, 2013

Teresa Stanek Rea
*Acting Director of the United States Patent and Trademark Office*